Nov. 1, 1932. V. L. TANNEHILL 1,886,135
WATER HEATER
Filed Oct. 1, 1930
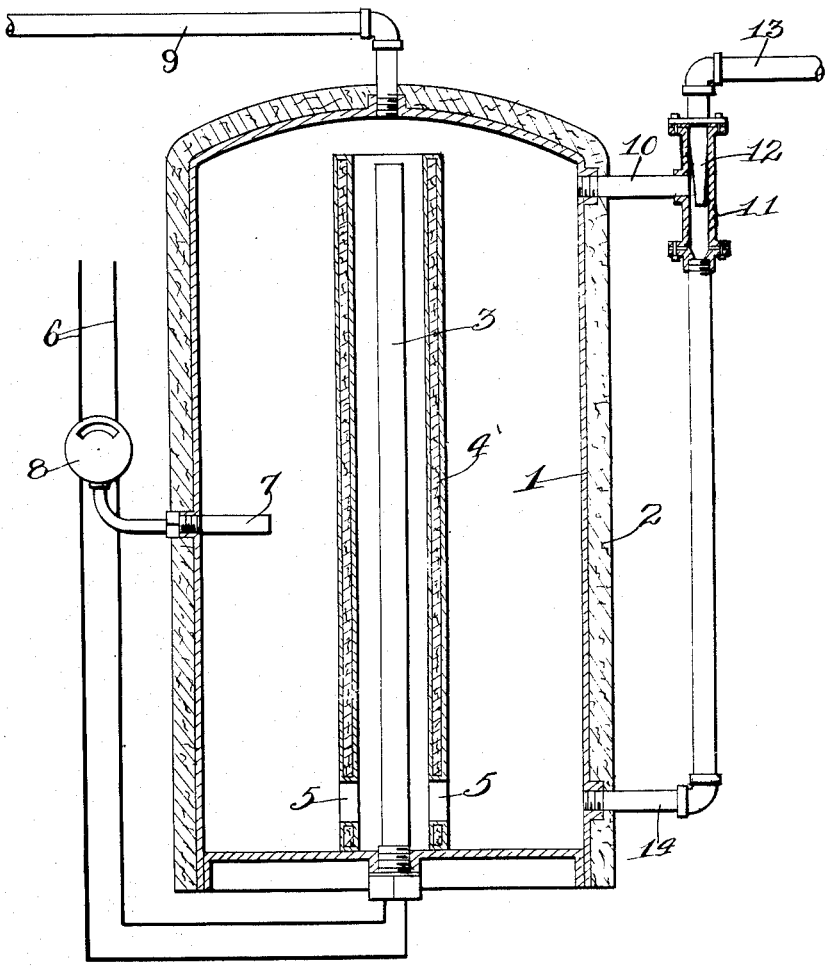

UNITED STATES PATENT OFFICE

VERNON L. TANNEHILL, OF FORT WAYNE, INDIANA, ASSIGNOR TO FORT WAYNE ENGINEERING AND MANUFACTURING COMPANY, OF FORT WAYNE, INDIANA

WATER HEATER

Application filed October 1, 1930. Serial No. 485,680.

This invention relates to improvements in water heaters.

One of the objects of this invention is the provision of a novel water heater including means for creating a recirculation of the heated water so as to mix the same with the incoming cold water thereby increasing the heating facilities of the heater and preventing the cold water from coming in direct contact with the heater so that the water will be more quickly heated than with the usual type of heater where the cold water is brought in the supply tank and urged into contact with the heater.

Another object of the invention is the provision of a water heater which includes a heating tank having a heating element positioned centrally thereof, with an outlet adjacent the top of the tank which leads into the inlet supply pipe whereby a portion of the heated water is mixed with the cold water being supplied to the tank, so that the water will be more quickly heated than if the cold water were supplied directly to the tank without mixing any of the warm water with it.

With the above and other objects in view, the invention consists in the novel features of construction, the combination and arrangement of parts hereinafter more fully set forth, pointed out in the claims and shown in the accompanying drawing wherein:

The view disclosing my invention illustrates a vertical sectional view of a water heater, embodying my invention with parts of the discharge and the supply pipes illustrated in elevation.

The improved water heater comprises a storage tank or casing 1 which is equipped with a thermal insulator 2. Within the tank an electric heater 3, or other member, is positioned. Preferably this heating element or member is surrounded by a double-wall, internally insulated shell 4 having an open top and having entrance apertures 5 adjacent its bottom. The electric heating element may be supplied from the electric means 6, which are in turn controlled by means of the thermostat 7. Any suitable indicating device 8 may be provided, if desired.

The water heater has an outlet pipe 9 communicating with its highest point, and has a pipe 10 extending from adjacent its top to an injector 11. The injector has its nozzle 12 connected to the water main or supply pipe 13 and has its discharge end connected to the pipe 14 leading into the lower portion of the storage casing. This inlet pipe 14 is in line with the apertures 5, so as to cause a rapid circulation of water into the shell 4 and upwardly through this shell past the heating element.

The operation of this apparatus is as follows: When the heater is first turned on the water is heated continuously until it arrives at a predetermined temperature, as determined by the thermostat. Thereafter the heater is cut off. If water is drawn from the discharge pipe 9 it is replaced by the cold incoming water. This incoming water entrains the heated water from the tank and mixes therewith and passes downwardly and circulates upwardly past the heating element or member. The apparatus causes the water to circulate past the heating member several times in proportion to the amount drawn from the discharge pipe.

It will be seen that the efficiency of the heating member is very much increased as no gas pockets, or other films, are allowed to occur which may insulate the heating element from the water itself, but instead the water is caused to intimately impinge upon or sweep past the heating element and thus maximum interchange is secured.

It will be seen further that the water heater may be of very small size in comparison to the ordinary types of water heaters of this general order, and that it functions very much in the nature of an instantaneous heater although it has storage space for the hot water.

I claim:

1. A water heater comprising a storage tank, a heating element arranged within the tank, a pipe for supplying cold water to the bottom of the tank, and means for drawing a part of the heated water from the top of the tank into said supply pipe, said means including a communication between the top of the tank and the water supply pipe.

2. A water heater comprising a storage tank, a heating element centrally disposed in the tank, a shell arranged in the tank enclosing the heating element and having an open top and apertures adjacent to its lower end, a hot water outlet pipe communicating with the highest point of the tank, a cold water supply pipe communicating with the tank adjacent to the apertures in the shell, an injector nozzle interposed in the cold water supply pipe having its restricted outlet end disposed in the direction of flow of the cold water, and a pipe connecting the upper end of the tank to the cold water supply pipe adjacent to the outlet end of said injector nozzle.

In testimony that I claim the foregoing I have hereunto set my hand at Fort Wayne, in the county of Allen and State of Indiana.

VERNON L. TANNEHILL.